Figure 1:
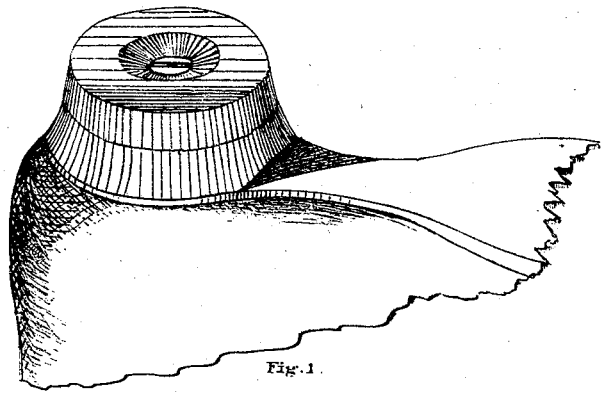

A. O. CRANE.
Improvement in Heels for Boots and Shoes.
No. 118,203. Patented Aug. 22, 1871.

Witnesses: J. M. Keith, William Standish

Inventor: A. O. Crane

UNITED STATES PATENT OFFICE.

ALBERT O. CRANE, OF BOSTON, MASSACHUSETTS.

IMPROVEMENT IN HEELS FOR BOOTS AND SHOES.

Specification forming part of Letters Patent No. 118,203, dated August 22, 1871.

*To all whom it may concern:*

Be it known that I, ALBERT O. CRANE, of the city of Boston, in the State of Massachusetts, have invented certain Improvements in Heels for Boots and Shoes, of which the following is a specification:

My invention relates to heels made, in part, of a compound of India rubber or other similar material, and molded into form, and particularly to rotary heels. Rotary heels are commonly made in two parts; the one part fastened directly upon the sole of the shoe, and remaining stationary there, is called the heel-seat; the other, called the tread part, is so attached to the former that it may be revolved upon it at pleasure. The first part of my invention, as shown in the drawing, is a new form of heel-seat, intended to be used in connection with the second part of my invention, which is a new mode of attaching to the heel-seat and revolving the tread part of such a rotary heel.

The tread part being made of a compound of India rubber, it is desirable that the heel-seat, for uniformity of appearance, should have an exterior of the same material; but, if made exclusively of such a compound, in attaching the heel-seat to the sole, in the usual manner, the yielding character of the compound would cause that surface of the heel-seat against which the tread part is to be placed to be left winding and uneven. To obviate this and to obtain a suitable bearing within the heel-seat for the revolving stud or button hereafter described, so that the new mode of revolving the tread part that I have invented can be more successfully operated, I embody in the heel-seat, when it is being molded, a frame of iron or other suitable material about one-sixteenth of an inch thick, of the general form to be given to the heel-seat, but so far less in size that when the heel-seat is molded the iron frame, except certain parts hereafter mentioned, will be covered by the rubber compound molded around it to a thickness of from about one-sixteenth of an inch upon the upper edge to a ranging thickness on the other parts, (according to its particular form,) the maximum of which is about one-quarter of an inch. In the bottom and center of the iron frame there is a circular hole about three-quarters of an inch in diameter, countersunk upon its upper edge, and having a circular flange of the same interior diameter as the hole, projecting about one-sixteenth of an inch below the under surface of the frame. Six or eight holes are also made in the frame about midway between its upper edge and the circumference of the central hole, through which nails may be driven to fasten the heel-seat to the sole, and corresponding but much smaller nail-holes are molded through the rubber compound enveloping it. In molding the heel-seat the mold is so arranged that the rubber compound is molded around the central hole in the iron frame, on its upper or concave surface, to about the thickness of one-quarter of an inch, and at a distance from it equal to the width of its countersunk edge, and so that this edge, and also the circular flange upon its under side, shall remain uncovered by the rubber compound. A circular stud or button, which had best be of iron, is made to fit easily the central hole in the iron frame, beveled to correspond with and to bear upon its countersunk edge. This stud or button should be of such thickness only that, when in place, its top will fall considerably below the upper surface of the heel-seat, so as not to be reached by the pressure of the foot when the heel is in use, and should so fit the central hole that its under surface will be level with and not below the general level of the under surface of the heel-seat, when the circular flange described will assume the form of a tongue corresponding to the circular groove in the tread part of the heel, hereafter described. A hole to receive a screw is made through the center of the stud or button, and one or two smaller holes elsewhere through it. The tread part of the heel is made to correspond in size to the heel-seat, and about one-half of an inch in thickness. Through its center a hole is formed, when the part is molded, to receive an ordinary screw. (It is better that the head of the screw should be quite large.) This hole is countersunk on the tread-surface to allow the head of the screw to enter the tread part of the heel about one-quarter of an inch, so as to be out of the way of abrasion when the heel is in use. On the inner surface of the tread part, when it is molded, a circular groove is formed centrally around the screw-hole to receive the circular flange or tongue upon the under surface of the heel-seat, already described; and between the screw-hole and the circular groove one or two pins or projections, of any suitable material, (but which I make of iron or of the rubber compound of which the tread part is made,) are fixed, corresponding in size and in position to the small holes in the iron stud or button, before mentioned. The tread part thus constructed is made fast to the heel-seat by a screw that enters the central hole in the stud or button, and, at the same time, the one or two pins or projections described enter the smaller holes in the stud or button, and the heel is ready for use.

The purpose of the circular flange and groove described is to aid in preserving the two parts of the heel in proper position with reference to each other, and to support the screw against lateral pressure; and the purpose of the pins or projections described is to so confine the tread part of the heel to the stud or button that, when the tread part is revolved, the stud or button shall revolve with it, while the screw remains undisturbed in its place. The pins or projections also serve to "pick up" the stud or button when the tread part is to be screwed on.

The circular flange and groove described are embraced in my invention, for which I made application for Letters Patent on or about January 3, 1871, and I do not claim the same in this application as new.

The heel-seat described may be adapted to the tread part of a rotary heel arranged to be revolved in the mode described in Letters Patent granted to me under date of December 15, 1868, and numbered 84,861, by substituting in place of the large central hole in the iron frame described a small central hole to receive the screw by which the tread part is fastened to the heel-seat, and other obvious variations.

Figure 2:
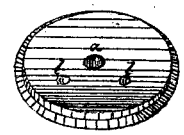
Figure 3:
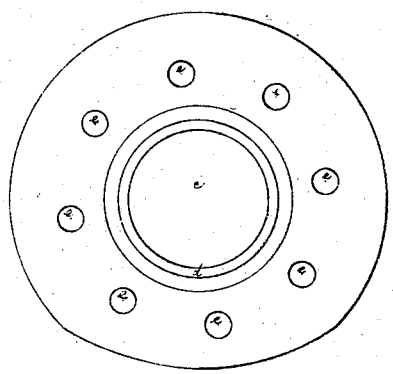
Figure 4:
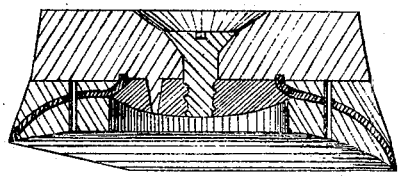
Figure 5:
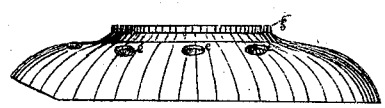
Figure 6:
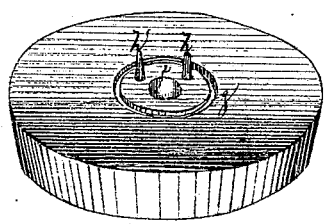

Figure 1 is the heel described fastened to the shoe and ready for wear. Fig. 2 is the revolving stud or button, showing the central hole for the screw $a$ and the smaller holes therein $b$. Fig. 3 is the iron frame, seen on its upper or concave surface, showing its central hole $c$, with its countersunk edge $d$, and the nail-holes through it $e$. Fig. 4 is a vertical section of the heel with all its parts in place, drawn through the center. Fig. 5 is the iron frame, seen on its under side, showing the circular flange $f$ and the nail-holes $e$. Fig. 6 is the tread-part of the heel, showing the circular groove $g$, the pins or projections on its inner surface $h$, and the central hole for the screw $i$.

I claim as my invention—

1. The heel-seat described, constructed substantially as and for the purposes hereinbefore set forth.

2. The mode of attaching to the heel-seat and revolving the tread part of a rotary heel by means of a stud or button within the heel-seat, which receives the screw by which the two parts of the heel are fastened together, and is so confined to the tread part that it revolves with it, substantially as described.

3. The combination of the heel-seat described and the stud or button within it with the tread part of a rotary heel, attached and revolving substantially as set forth.

A. O. CRANE.

Witnesses:
  J. M. KEITH,
  WILLIAM STANDISH.